UNITED STATES PATENT OFFICE.

ARTHUR SMITH, OF LONDON, ENGLAND.

PROCESS OF PRODUCING MATERIAL SUITABLE FOR ELECTRIC INSULATION OR OTHER PURPOSES.

SPECIFICATION forming part of Letters Patent No. 643,012, dated February 6, 1900.

Application filed August 17, 1899. Serial No. 727,587. (No specimens.)

*To all whom it may concern:*

Be it known that I, ARTHUR SMITH, analytical chemist, a citizen of England, residing at 90 Wickham road, Brockley, London, in the county of Kent, England, have invented a certain new and useful Process of Producing Material Suitable for Electric Insulation or other Purposes, (for which I have made application for a British patent, dated August 9, 1899, No. 16,247,) of which the following is a specification.

My invention relates to the production of a new material adapted for electrical insulation and also for many purposes for which ebonite, wood, and such like materials are used, such as cells, partitions, boxes, or other parts of electrical apparatus. As the material resists the action of most chemical substances it may be used in apparatus in which these substances are treated. For this purpose I mix two parts, by measure, of acetic paraldehyde with one part, by measure, of methylated spirit. To this I add three parts, by measure, of liquid carbolic acid which had been liquefied by adding five per cent. of water. To this mixture, in a closed vessel, I add in small doses while cooling three to six parts, by measure, of fusel-oil or methylated spirit which had been saturated with hydrochloric-acid gas, the temperature being kept below 80° Fahrenheit. Instead of using the saturated fusel-oil or methylated spirit alone a mixture of one part of fusel-oil to two or three of methylated spirit may be employed. Within the scope of my invention the fusel-oil, the methylated spirit, and the mixture of the two are equivalents, and the claims appended to the specification are intended in that light. When the saturated fusel-oil is used alone, the product is black like ebonite.

I pour the mixture above described into a mold suited to the article to be produced and previously greased to prevent adhesion, and after the material has set I remove the molded article from the mold and dry it at 212° Fahrenheit. For some purposes the molded article is preferably impregnated with paraffin. This may be done by immersing the molded article either before or after it is dried in paraffin or ozocerite melted at about 120° Fahrenheit, the temperature being then slowly raised to 212° Fahrenheit during a period of twelve to thirty hours, according as the article is of less or greater thickness, and then slowly cooled.

In the above process when acetic aldehyde can be obtained pure it may be used instead of the acetic paraldehyde in double quantity.

The two species of aldehyde mentioned, as well as the polymerized formic aldehyde next referred to, are equivalents in my invention.

Also, instead of the acetic paraldehyde, I may employ polymerized formic aldehyde dissolved in fusel-oil saturated with hydrochloric or its equivalent sulfurous-acid gas, the proportions being one part of formic aldehyde to four and a half or five parts of the gas-saturated fusel-oil after separating the acid water. To this are added carbolic-acid crystals in such quantity that when they are dissolved they add fifty per cent. to the volume of the mixture. This mixture sets rapidly, producing a pink translucent solid and is to be molded and treated as above described.

In any of the processes above described before adding the gas-saturated fusel-oil or methylated spirit, resin, lac, or such like gums, soluble in the mixture, may be added to it to the extent of five or ten per cent. for the purpose of hardening and cheapening the product.

The material produced as above described may be molded in slabs or other forms by itself or absorbed in asbestos pulp.

By slightly reducing the proportion of the gas-saturated fusel-oil or methylated spirit the material can be produced in a plastic condition capable of being pressed into various forms.

Having thus described the nature of this invention and the best means I know of carrying the same into practical effect, I claim—

1. The herein-described process for producing a material suitable for electric insulation and other purposes, the said process consisting in mixing acetic paraldehyde with methylated spirit, carbolic acid and methylated spirit which had been saturated with hydrochloric-acid gas, molding and saturating with paraffin.

2. The herein-described process for producing a material suitable for electric insulation and other purposes, the said process consisting in mixing acetic paraldehyde with methylated spirit, carbolic acid and methylated spirit which has been saturated with hydrochloric-acid gas, and molding.

In testimony whereof I have hereunto set my hand in presence of two subscribing witnesses.

ARTHUR SMITH.

Witnesses:
FRED C. HARIES,
GERALD L. SMITH.